US007182565B2

(12) United States Patent
Buytaert et al.

(10) Patent No.: US 7,182,565 B2
(45) Date of Patent: Feb. 27, 2007

(54) FLUTE HOLDER

(75) Inventors: Donald Buytaert, Huntley, IL (US); Richard J. Ernst, San Diego, CA (US); George Matthew Davis, Stone Mountain, GA (US)

(73) Assignee: Illinois Tool Works Inc., Glenview, IL (US)

( * ) Notice: Subject to any disclaimer, the term of this patent is extended or adjusted under 35 U.S.C. 154(b) by 4 days.

(21) Appl. No.: 10/960,245

(22) Filed: Oct. 7, 2004

(65) Prior Publication Data

US 2006/0078405 A1 Apr. 13, 2006

(51) Int. Cl.
*F16B 15/00* (2006.01)

(52) U.S. Cl. ...................................... 411/441; 411/999

(58) Field of Classification Search ................ 411/440, 411/441, 999

See application file for complete search history.

(56) References Cited

U.S. PATENT DOCUMENTS 3,137,195 A * 6/1964 Rosenberg, Jr. ............. 411/441
3,289,522 A 12/1966 Bell
3,377,903 A * 4/1968 Korte ......................... 411/441
3,382,751 A 5/1968 Kopf
4,028,986 A 6/1977 Beton
4,038,801 A * 8/1977 Busch ......................... 52/698
4,802,802 A * 2/1989 Thurner ...................... 411/107
5,382,124 A * 1/1995 Frattarola .................. 411/352
5,569,010 A 10/1996 Janssen et al.
5,833,420 A 11/1998 Schmidle et al.
6,162,002 A * 12/2000 Rohrmoser et al. .......... 411/441
6,334,749 B1 * 1/2002 Orr ............................ 411/461
6,352,398 B1 * 3/2002 Gonnet ....................... 411/441
6,668,829 B2 2/2004 Popovich et al.
6,688,829 B1 * 2/2004 Popovich et al. ........... 411/441

FOREIGN PATENT DOCUMENTS

FR 2 832 665 A 5/2003
GB 1 535 951 A 12/1978
WO 91/00792 A 1/1991

OTHER PUBLICATIONS

Powers Fasteners, "Powder Actuated Fastening Systems," believed available circa 2004.
Hilti Corp., "X-FB DNI Metal Conduit/Pipe Clip for Concrete," Sales sheet, believed available circa 2001.
ITW/Ramset, "Ramset Fastening Systems," see particularly pp. 11, 18-19 and 24-30, believed available circa 2002.

* cited by examiner

*Primary Examiner*—Flemming Saether
(74) *Attorney, Agent, or Firm*—Lisa M. Soltis; Mark W. Croll; Greer, Burns & Crain Ltd.

(57) ABSTRACT

A flute holder comprises a bracket-engaging portion configured to engage a bracket, and a tool-engaging sleeve connected to the bracket-engaging portion and configured to engage a tool. A holding passage is at least partially defined within the tool-engaging sleeve.

26 Claims, 8 Drawing Sheets

FLUTE HOLDER

FIELD OF THE INVENTION

The present invention is related to fastener holders, including holders for attaching a fastener to a bracket.

BACKGROUND OF THE INVENTION

Fasteners such as nails, screws, bolts and the like are well known in the art, and may be used in a variety of applications, including for attaching brackets and other items to a substrate. One exemplary fastener and application for its use is a nail or pin useful to attach a bracket to a substrate such as a wall, ceiling, or other surface. A hammer or an automated driving tool such as a pneumatic or powder actuated tool may be used to drive the nail. For convenience, brackets may be provided with a fastener that is suitable for use with the bracket. For an even greater level of convenience, a holder may be provided that retains the fastener to the bracket.

For example, a so-called "top hat" or "eyelet" holder is known for retaining a fastener within a bracket passage. Typical top hat holders have a hollow tube portion for frictionally engaging the insertion tip of a fastener shaft, and a lowermost annular rim that is larger in size than the bracket passage. The annular rim prevents the holder from passing through the bracket passage and therefore prevents the top hat with the fastener held therein from separating from the bracket. When the bracket is to be installed, the bracket is placed onto a substrate with the top hat annular rim laying generally flat on the substrate so that the fastener extends upward for driving into the substrate through the bracket passage. When the fastener head is struck by a tool, the fastener head penetrates through the bottom of the top hat holder and into the substrate.

Although such holders are known, they leave several problems and needs unresolved. For example, fasteners held to a bracket by a top hat holder are not held in a stationary position, but instead are free to move some distance in the vertical and horizontal directions. As a result, the fastener is not held stable relative to the bracket. When a bracket is to be attached to a surface, the fastener must be manually manipulated and held stable in a desired position. This typically requires a user to dedicate a hand to holding the fastener. A user is thus left with only one hand to operate the driving tool. In some circumstances, such as installation of a bracket onto an overhead surface like a ceiling, this may be difficult. One-handed operation would be preferred. Further, when installing a bracket on a surface that is not easily accessed, such as a ceiling, there is a chance that the user will not position the fastener at a 90° angle to the surface. In this case the fastener may be driven into the surface at a less than desirable angle which can result in a substantially weakened holding force, and may even result in a bent or otherwise damaged fastener.

When using brackets and fasteners with automated driving tools such as a driving tool, it is also known to use a fastener positioner for positioning the fastener head in the tool barrel. For example, a pliable ring with outward extending fingers may be positioned on the fastener shaft. The fingers of the ring engage the wall of a tool barrel when the fastener is inserted therein to help to center the fastener head within the barrel. Often, a ring such as this is used in combination with a holder such as a top hat.

Known positioner rings fail to solve several problems in the art. For example, when used with a top hat or other holder, the collar is usually attached to the fastener separate from the holder. This results in a two-step preparation process that is relatively costly and time consuming. Additionally, different tools may have different barrel diameters. Different sized rings are required for different sized tool barrels. Also, the angle of incidence of the fastener into the substrate can be critical to the fastening of a bracket. The angle of incidence depends to a large degree on the angle at which the fastener is oriented in the tool barrel. Known positioner rings are generally limited in length and are free to slide along the shaft of a fastener. As a result, the angle of orientation of the fastener to the driving tool may vary from the desired. Accordingly, many needs and problems remain unresolved in the art.

SUMMARY OF THE INVENTION

An exemplary flute holder includes a bracket-engaging portion configured to engage a bracket and a tool-engaging sleeve connected to the bracket-engaging portion and configured to engage a tool. A holding passage is at least partially defined within the tool-engaging sleeve. The present flute holder combines the functions of holding a fastener to a bracket and positioning the fastener head for receiving a driving force from a tool. In another exemplary embodiment, a fastener is held in the holding passage, and the flute holder is engaged with a bracket.

DETAILED DESCRIPTION

Figure 1:
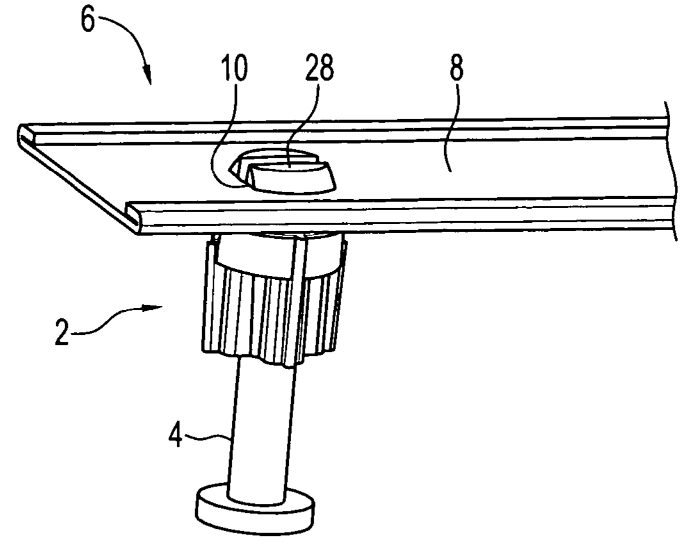
FIG. 1 is a perspective of an embodiment of the present flute holder being used to attach a fastener to a bracket.

Turning now to the drawings, a first exemplary flute holder of the invention is illustrated in various views in FIGS. 1–8. As shown by FIG. 1, the exemplary flute holder 2 is for holding a fastener such as a pin or a nail 4, and for attaching the nail 4 to a bracket 6. The nail 4 is held by the flute holder 2 in a relatively stable and substantially perpendicular position relative to a flat mounting plate 8 of the bracket 6 and within a bracket passage 10 that extends through the plate 8. In this orientation, the nail 4 is advantageously positioned for convenient driving by an insertion tool such as a powder or gas actuated driving tool.

Figure 2:
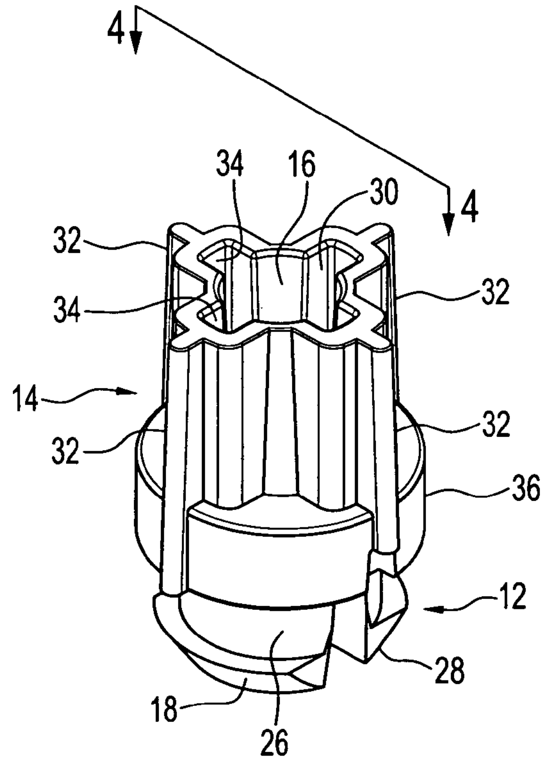
FIG. 2 is a perspective of the flute holder of FIG. 1.
Figure 3:
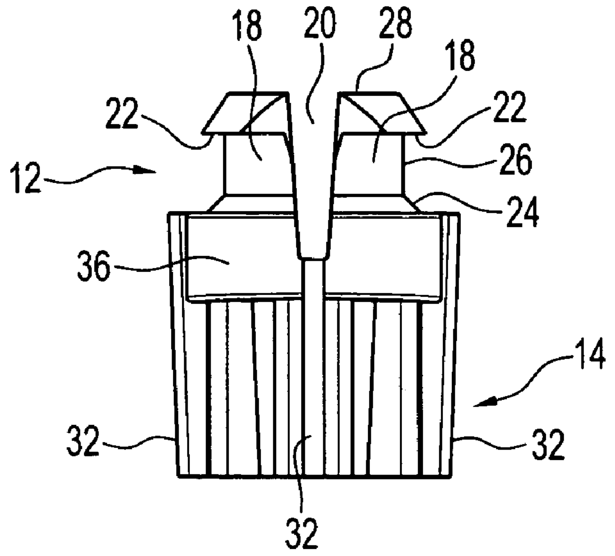
FIG. 3 is a side elevational view of the exemplary flute holder of FIG. 2.
Figure 4:
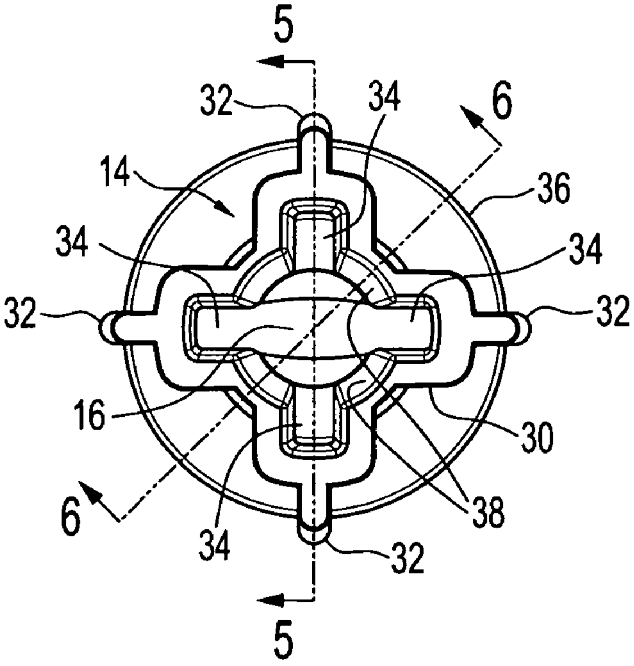
FIG. 4 is a top plan view of the exemplary flute holder.

FIGS. 2–4 show the flute holder 2 in detail. The flute holder 2 includes a bracket-engaging portion shown generally at 12 at one end, a tool-engaging sleeve shown generally at 14 opposite the bracket-engaging portion 12, and a holding passage or throughbore 16 defined within the tool-engaging sleeve 14 and by the bracket-engaging portion 12. The bracket-engaging portion 12 is configured to be inserted through the bracket passage 10 (FIG. 1), and to engage the bracket mounting plate 8 when so inserted. The tool-engaging sleeve 14 is configured to be received within a barrel of a tool such as a gas or powder actuated driving tool to desirably position the held fastener for receiving a driving force from the tool. The holding passage 16 is configured to hold a fastener such as the nail 4 (FIG. 1).

As best shown by FIGS. 2 and 5–7, the bracket-engaging portion 12 includes a plurality of feet 18 that are separated from one another by a generally V-shaped slot 20. Two symmetrically opposing feet 18 are provided, with a continuous slot 20 extending across the bracket-engaging portion 12 separating the feet 18 from one another. It will be appreciated that in other embodiments of the invention, other numbers of slots 20 may be provided. For example, if a different number of feet 18 were provided, a different number of slots 20 would be present. Further, the slot(s) 20 need not be continuous. If three feet 18 were provided, by way of specific example, three discontinuous slots 20 may be provided.

The feet 18 each preferably include a barb-like lower shoulder 22 and an upper shoulder 24 that define an annular groove 26 between them. The annular groove 26 extends about the perimeter of the bracket-engaging portion 12. At least one of the upper and lower shoulders 22 and 24 is preferably tapered towards the other, with upper shoulder 24 being tapered in the flute holder 2. The ends of the insertion feet 18 define an insertion end 28, which is preferably tapered.

Figure 7:
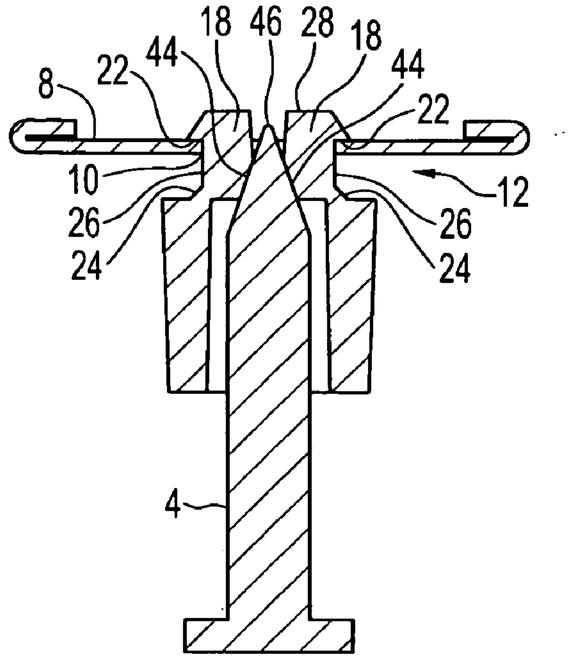
FIG. 7 is a vertical cross section of the flute holder, fastener, and bracket shown in FIG. 1.

As best illustrated by FIGS. 1 and 7, the insertion end 28 is tapered to aid in inserting the bracket-engaging portion 12 into the bracket passage 10. When so inserted, the bracket mounting plate 8 is fixedly engaged between the lower shoulder 22 and upper shoulder 24 and proximate to or within the annular groove 26. The tapered upper shoulder 24 allows the engaging portion 12 to be snugly fit into different sized bracket passages 10 with varying passage diameters and passage lengths in the axial direction (i.e. bracket mounting plate 8 thickness), since the holding power may be provided by the engagement of one or both of the shoulders 22 and 24 with the bracket mounting plate 8. Depending on the diameter of the bracket passage 10, the annular groove 26 may engage the bracket passage 10, or a space may result between the bracket passage 10 and the annular groove 26.

As the tapered insertion end 28 is first inserted into the bracket passage 10, the normally outwardly biased feet 18 are urged towards one another and into the space that separates them created by the slot 20. When the lower shoulder 22 emerges through the bracket passage 10, the feet 18 move away form one another and substantially recover their original position. To accomplish this, the preferred feet 18 have some degree of flexibility and an elastic memory sufficient to regain and hold their shape after insertion. An exemplary material of construction of the feet 18 is a relatively resilient thermoplastic. The specific material may vary depending on design criteria including cost, weight, strength, appearance, and the like. The lower shoulder 22 preferably has a short enough axial length so that the bracket 6 may be positioned relatively flat on an underlying substrate. Bracket extensions, a concave bracket portion, or a similar configuration may be provided on the bracket 6 to create a space sufficient to accommodate the lower shoulder 22.

Referring again to FIGS. 2 and 3, the tool-engaging sleeve 14 is preferably integral with the plurality of feet 18. As used herein, the term "integral" is intended to be broadly interpreted as meaning substantially continuous with. For example, two elements may be integral with one another if they are welded together, are seamlessly continuous with one another, or formed of the same material and at the same time. A particular example of elements integral with one another is two elements that have been formed together in the same molding process. The preferred tool-engaging sleeve 14 is formed in the same injection molding process with the bracket-engaging portion 12 using a suitable material such as a thermoplastic polymer. Two exemplary materials are polypropylene and polyethylene. It has been discovered that such fabrication provides for low cost manufacture in combination with a desirable mechanical strength, appearance and other benefits.

Referring now to FIGS. 2 and 4, the preferred tool-engaging sleeve 14 has a general cross shape and includes a sidewall 30. A plurality of exterior fins 32 extend radially outward from the sidewall 30. The exterior fins 32 are configured to be received by and to slidingly engage the interior of a tool barrel, such as a powder or combustion actuated nail-driving tool. The flute holder 2 includes four exterior fins 32 that have a length along the major axis of the tool-engaging sleeve 14 from its upper end to a lower termination point proximate the upper shoulder 24 of the feet 18. Although not illustrated as such, it is contemplated that the fins 32 may be tapered along their entire length, so that they extend a maximum distance radially outward from the tool engaging sleeve 14 near their termination point. This may be desirable, for example, to ease the insertion of the flute holder 2 into a tool barrel and to allow the flute holder to be used in tool barrels of different diameters.

In the flute holder 2, the tool-engaging sleeve sidewall 30 includes a plurality of channels 34 formed on the interior of the sidewall 30 that extend in an axial direction. The exemplary flute holder 2 includes four channels 34 that are equally spaced about the throughbore 16, and are arranged to be generally coincident with the exterior fins 32. The channels 34 do not extend as far down the flute holder 2 as the exterior fins 32, but instead terminate at a point where the sidewall 10 includes a thicker washer region 36.

Figure 8:
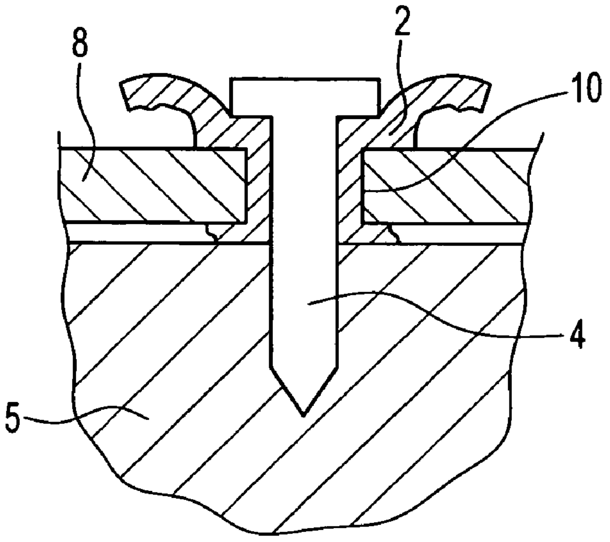
FIG. 8 is a cross section of the present flute holder in a deformed condition after a fastener has been driven into a substrate to hold a bracket in place.

The channels 34 have been discovered to aid the splitting of the tool-engaging sleeve 14 as a fastener held in the flute holder 2 is driven down into the holding passage 16. Referring to FIG. 8, the flute holder 2 is shown compressed and deformed after the nail 4 has been driven into an underlying substrate S to attach the bracket 6 thereto. With reference to FIGS. 2 and 4, the tool-engaging sleeve 14 has been discovered to generally split into quarters along the four evenly spaced and axially oriented channels 34 when the nail 4 is driven downwards and into the substrate S. As generally shown by FIG. 8, the flute holder 2 is deformed through this action, with a portion that generally includes the washer region 36 flattened and left between the head of the nail 4 and the bracket 6. An additional flattened portion may remain between the bracket 6 and the underlying substrate. Because the tool-engaging sleeve 14 splits into relatively even quarter portions, a generally evenly distributed portion of the flute holder 2 remains between the head of the nail 4 and the bracket mounting plate 8 after insertion. This aids in achieving a favorably oriented insertion into the substrate that is substantially near to 90°.

Figure 6:
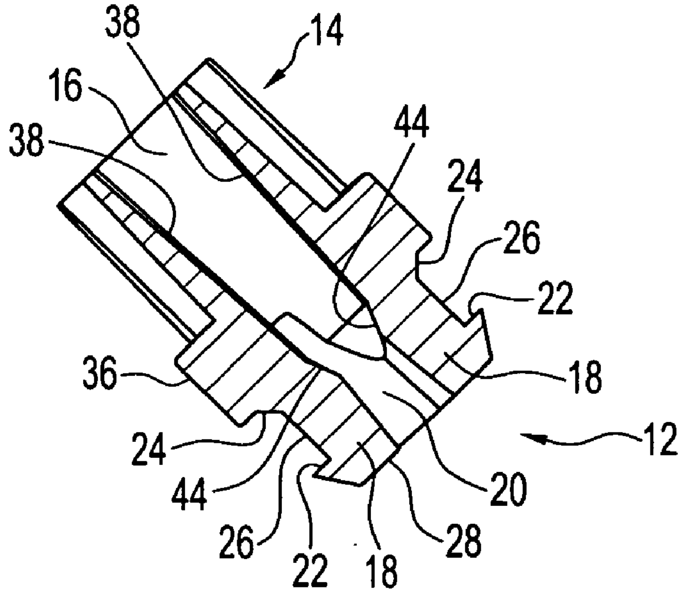
FIG. 6 is a vertical cross section viewed along the line 6—6 of FIG. 4 and in the direction generally indicated.

Referring again to FIGS. 1–4, the washer region 36 is generally cylindrically shaped and includes a relatively increased wall thickness compared to the other portions of the tool-engaging sleeve 14 (FIG. 6). The washer region 36 is adjacent to the plurality of feet 18, and a portion of the feet-separating slot 20 extends into the washer region 36. The exterior fins 32 extend over the washer region 36. Also, the upper annular shoulders 24 are partially defined by a bottom edge of the washer region 36.

The washer region 36 desirably provides enhanced stability and rigidity to the sidewall 30, and also provide for a more firm and stable engagement between the holder 2 with a bracket 6 (FIG. 1). This aids the flute holder 2 in holding fasteners such as the nail 4 in a substantially 90° orientation relative to the bracket plate 8. Also, because the washer region 36 is connected to the flexible exterior fins 32, it adds stiffness to the exterior fins, particularly near the lower portion of the exterior fins. It has been discovered that this increased stiffness aids in providing a relatively stable engagement between the tool-engaging sleeve 14 and the tool barrel, and thereby aids in achieving a desirable nail 4 orientation in the tool barrel and the angle of insertion into an underlying substrate. Finally, the washer region 36 is beneficial in that it may form a washer between the head of a fastener 4 and the bracket 8 after insertion of the fastener 4 into a substrate S, as generally shown by FIG. 8.

As best illustrated by FIGS. 4–7, the holding passage 16 is defined within the tool-engaging sleeve 14 and by the plurality of bracket-engaging feet 18. The holding passage 16 is configured for frictionally engaging the shaft of a fastener such as the nail 4 (FIG. 7), and includes a plurality of interior engaging surfaces 38 that are formed at the innermost portions of the cross-shaped sidewall 30 (FIG. 6). Preferably these engaging surfaces are tapered (FIG. 6) to cooperate with the shape of a fastener such as the nail 4 (FIG. 7).

Figure 5:
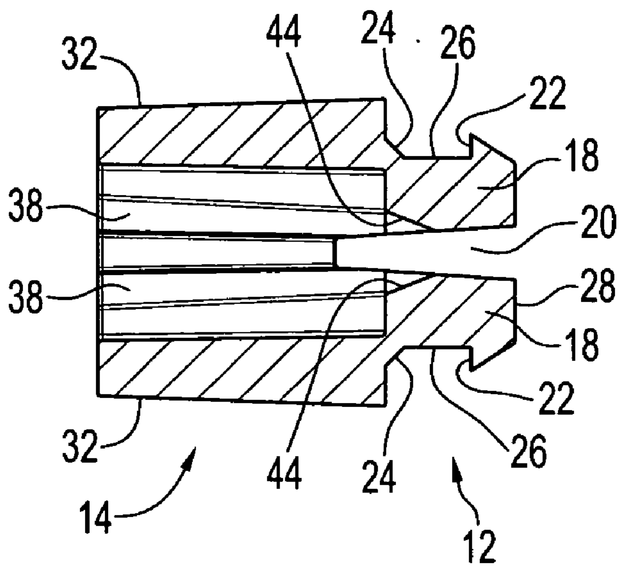
FIG. 5 is a vertical cross section viewed along the line 5—5 of FIG. 4 and in the direction generally indicated.

As best shown by FIGS. 5–7, two opposing cams 44 are defined near the exit of the holding passage 16. The cams 44 generally face each other and are separated from one another by the slot 20. The cams 44 are formed within the feet 18, and in combination with one another form a general funnel shape that is configured to engage the fastener 4 proximate to its pointed insertion tip 46. The engaging surfaces 38 are preferably tapered to smoothly transition to the cams 44. Each of the cams 44 is configured to exert an outward force in a direction generally transverse to the major axis of the holding passage 16 when the portion of the fastener 4 proximate to its insertion tip 46 of the fastener 4 moves downward through the passage and into engagement with the cams. This outward force has been discovered to be advantageous in causing the feet 18, including the annular groove 26 and the lower shoulders 24 and 22 (FIG. 3) to move outwards towards the bracket 6, and to thereby aid in firmly engaging the bracket mounting plate 8.

The flute holder 2, its feet 18, and its cams 44 are also preferably configured to hold the fastener 4 with its insertion tip 46 contained in the flute holder. That is, the insertion tip 46 is preferably held in a position between the feet 18 and separated or equidistant from the feet insertion ends 28. This is desirable for safety reasons, as well as to protect the insertion tip 46 of the fastener 4 from losing sharpness during shipping and storage.

It will be appreciated that the flute holder of the invention thereby solves many otherwise unresolved problems of the prior art, and offers many advantages and benefits. For example, an exemplary flute holder of the invention provides a single integral holder that holds a fastener to a bracket in a relatively fixed and stable position relative to the bracket that is desirably near to a 90° orientation, and also positions the fastener for operation on by a driving tool. A user can thereby attach the bracket to a surface using one-handed operation. The relatively firm and fast positioning of a fastener at a near to 90° angle with the bracket can result in a desirable angle of insertion into an underlying substrate when the fastener is driven.

Figure 9:
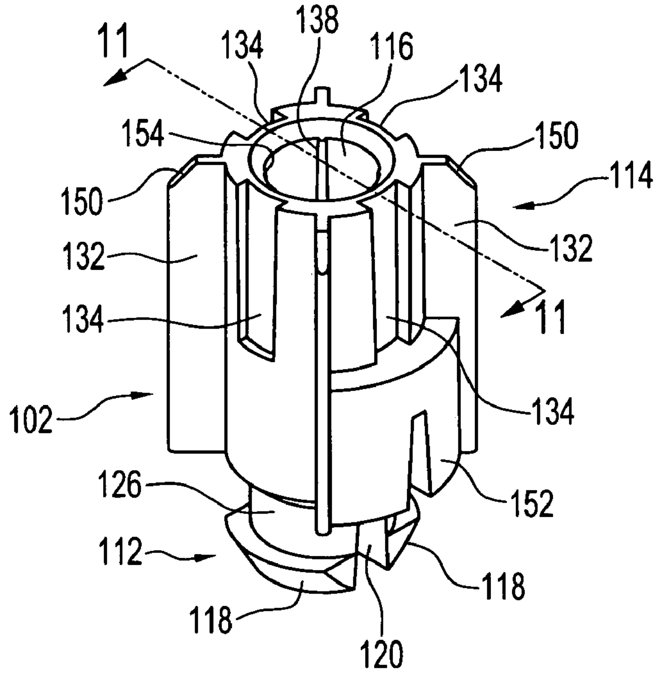
FIG. 9 is a perspective of an alternate embodiment of the present flute holder.
Figure 10:
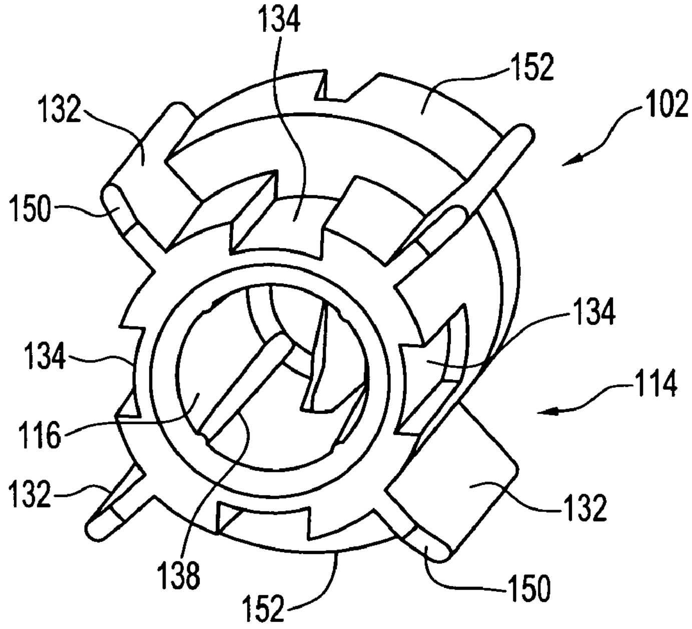
FIG. 10 is an additional perspective of the flute holder of FIG. 9.
Figure 11:
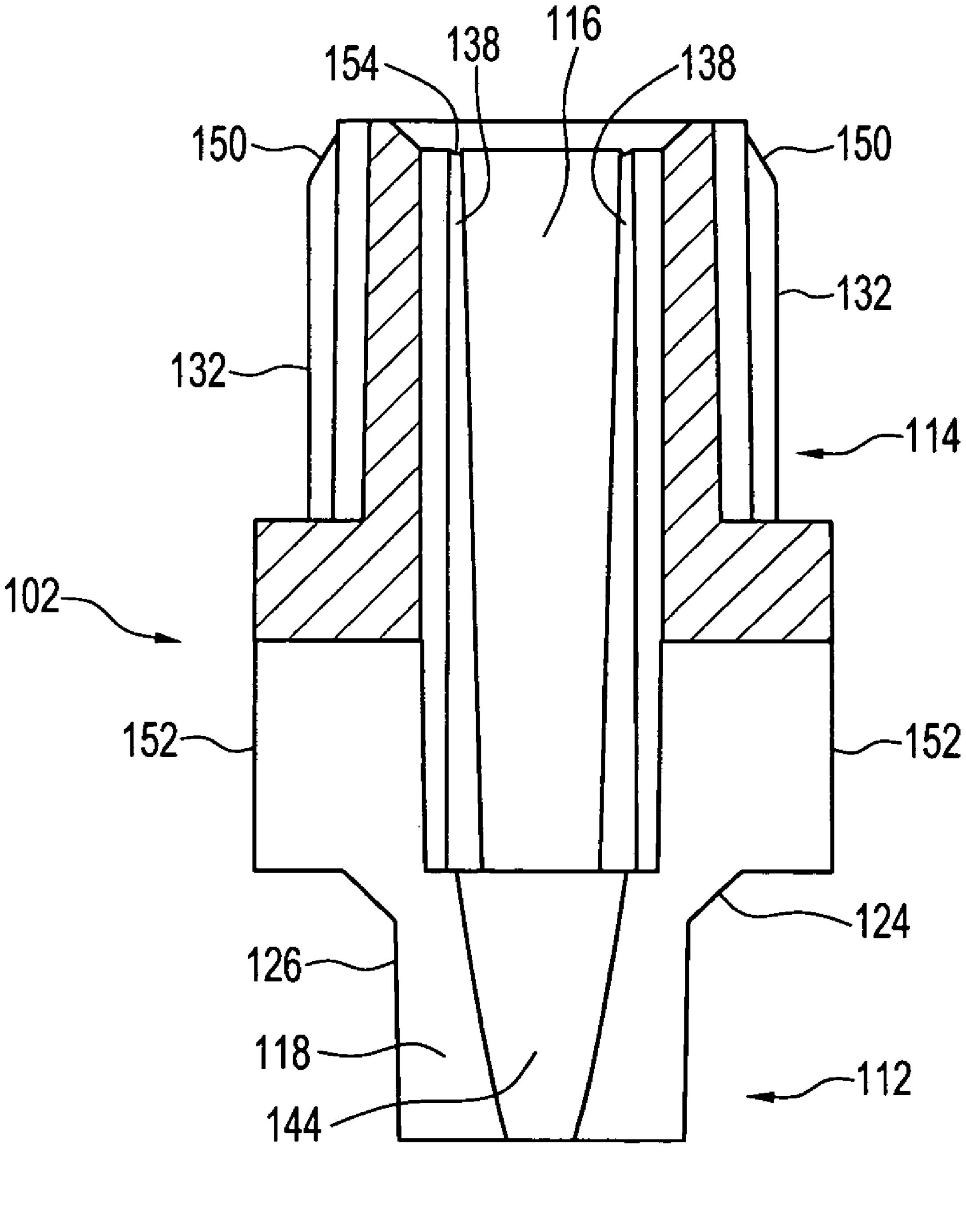
FIG. 11 is a cross section of the flute holder of FIG. 9 viewed along the line 11—11 of that FIG. in the direction generally indicated.

It will be appreciated that in addition to the exemplary flute holder 2 of FIGS. 1–8, many other flute holder configurations are within the scope of the present invention. By way of particular example, FIGS. 9–11 illustrate a second exemplary flute holder 102 of the invention. For convenience, 100 series element numbers have been used to identify elements of the flute holder 102 that are consistent in form and/or function to the same elements of the flute holder 2 of FIGS. 1–8. By way of example, the flute holder 102 includes a bracket-engaging portion 112, a tool-engaging sleeve 114, and a holding passage or throughbore 116. For sake of brevity, detailed description of elements of the flute holder 102 will not be made, and can be had instead by reference to discussion herein above of the corresponding element in the flute holder 2.

Discussion will be useful, however, to draw attention to some elements of the flute holder 102 that are differently configured than those of the flute holder 2. For example, the flute holder 102 includes a tool-engaging sleeve 114 that is configured differently than the tool-engaging sleeve 14 of the flute holder 2. The tool-engaging sleeve 114 is generally cylindrically shaped as opposed to the generally cross-shaped engaging sleeve 14 (FIGS. 2–4). The generally cylindrical-shaped sidewall 130 includes channels 134 defined on its exterior as opposed to the channels 34 along the sidewall 30 interior of the flute holder 2 (FIGS. 2–4). These channels 134 perform some of the same functions as the channels 34 of the flute holder 2, and, for example, aid in the splitting apart of the tool-engaging portion 114 as a fastener supported by the flute holder 102 descends downward into a substrate.

Each of a plurality of exterior fins 132 on the tool-engaging sleeve 114 preferably includes a tapered upper end 150. It has been discovered that the tapered ends 150 are useful for ease of insertion into a tool barrel, and also to aid in centrally locating the tool-engaging sleeve 114 in the tool barrel. The tapered ends 150, in combination with relatively flexible exterior fins 132, further advantageously allow the plastic flute holder 102 to be used with a variety of different diameter tool barrels.

The tool-engaging sleeve 114 also features a differently configured washer region 138 than the flute holder 2. The washer region 138 of the flute holder 102 includes two increased sidewall thickness regions 152 arranged symmetrically to one another. Each increased thickness region 152 extends for about 90° about the perimeter of the sidewall 130, and is arranged to extend between pairs of the exterior fins 132. Preferably, the generally V-shaped slot 120 that separates the feet 118 from one another is partially defined within the increased wall thickness regions 152.

The tool-engaging sleeve 114 further includes an alternately configured holding passage 116 as compared to the holding passage 16 of the flute holder 2 (FIGS. 2–4). For example, in the holder 102 the engaging surfaces 38 of the flute holder 2 take the form of engagement fins 138 that extend from the sidewall 130 into the throughbore 116. The engagement fins 138 are preferably tapered so that they extend an increasing radial inward distance from the sidewall 130 into the throughbore 116 proximate to the cams 144 than they do proximate their ends 154. This tapered shape helps to guide a fastener towards the cams 144, and also aids the holding passage 116 in engaging fasteners with different diameters. The upper ends 154 of the engagement fins are also preferably tapered as illustrated to ease initial engagement with a fastener.

Figure 12:
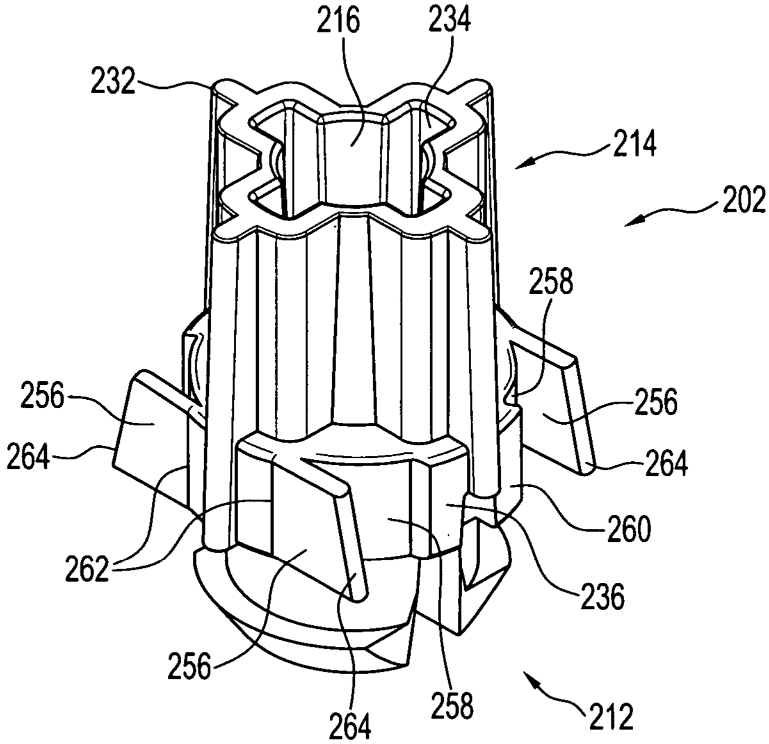
FIG. 12 is a perspective of a third embodiment of the present flute holder.
Figure 13:
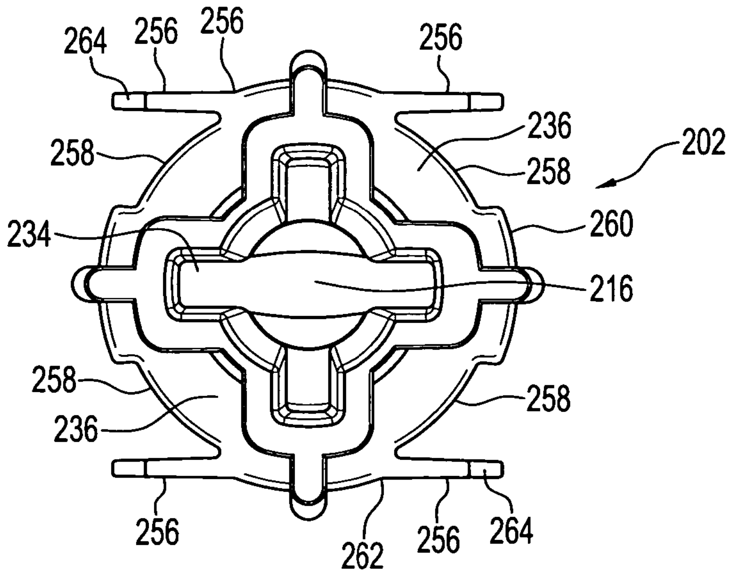
FIG. 13 is a top plan view of the flute holder of FIG. 12.

FIGS. 12–13 illustrate a third exemplary flute holder 202 of the invention. For convenience, 200 series element numbers have been used to identify elements of the flute holder 202 that are consistent in form and/or function to the same elements of the flute holder 2 of FIGS. 1–8 as well as the flute holder 102 of FIGS. 9–11. By way of example; the flute holder 202 includes a bracket-engaging portion 212, a tool-engaging sleeve 214, and a holding passage or throughbore 216. The tool engaging sleeve 214 is generally consistent with the sleeve 14 of the flute holder 2 (FIGS. 1–6), and includes, for example, channels 234 arranged in a general cross pattern and coincident with external fins 232. For sake of brevity, detailed description of elements of the flute holder 202 that are consistent with corresponding elements of the flute holder 2 (and/or flute holder 102) will not be made, and can be had instead by reference to discussion herein above of the corresponding element in the flute holder 2 (and/or 102).

Detailed discussion will be useful, however, regarding elements of the flute holder 202 that are not consistent with the flute holders 2 and 102. As shown by FIG. 12, a plurality of spring extensions 256 are on the washer region 236. The spring extensions 256 extend outward from the washer region 236 with a spring force. The washer region 236 further includes a plurality of storage channels 258 configured to store the spring extensions 256. Although the spring extensions 256 are illustrated as being connected to the washer region 236, other flute holders of the invention may include spring extensions 256 in other locations, including on the tool engaging sleeve 214 and elsewhere.

The spring extensions 256 include a first end 262 and a second end 264 distal from the first. The first end 262 is connected to the washer region 236 along the axial direction of the washer region 236, and the spring extension 256 preferably extends for substantially all of the axial height of the washer region 236. Preferably the spring extensions 256 are pliable, but resilient enough to provide holding power. They may have, for example, the resiliency of a relatively stiff rubber or elastomeric polymer. The spring extensions 256 are also preferably integral with the washer region 236 and are made of the same resilient thermoplastic material as is the remainder of the flute holder 202 in a molding process. In their relaxed state, the spring extensions 256 are extended outward from the washer region 236 as shown in FIGS. 12 and 13. The integral connection and thermoplastic construction give the spring extensions a spring force that urges them towards this relaxed state.

The spring extensions 256 may also be urged into a storage position in the storage channels 258. When stored in the channels 258, the spring extensions 256 preferably have a thickness in the radial direction of the washer region 236 that is no greater than the depth of the corresponding channel 258 in the radial direction of the washer region 236. Also, the storage channels 258 have a width along the circumference of the washer region 236 that is preferably at least as great as the length of the spring extension 256 between its distal ends 262 and 264 so that when the spring extensions 256 are stored in the channels 258 they are substantially flush with the washer region outer surface 260.

As the flute holder 202 is inserted into a tool barrel, the spring extensions 256 may be urged some distance back towards the washer region 236. In this position, the spring force of the spring extension 256 urges the second end 264 outwards and into engagement with the tool barrel. If the tool barrel is sufficiently small, the extensions 256 may be urged into a storage position within the storage channels 258. Preferably, the spring extension second end 264 is tapered so that the extension 256 extends out from the washer region 236 in a shorter length closer to the tool engaging sleeve 214 and in a longer length closer to the bracket engaging portion 212 as shown. This is useful to ease insertion of the flute holder 202 into a tool barrel.

In the exemplary flute holder 202, four spring extensions 256 are provided and are arranged in opposing pairs about 180° from one another about the perimeter of the washer region 236. Other numbers and placement of the spring extensions 256 are also contemplated. Each of the spring extensions 256 is preferably placed in a position that is generally opposite to another spring extension 256 about the perimeter of the washer region 236 to provide a relatively balanced holding power.

Figure 14:
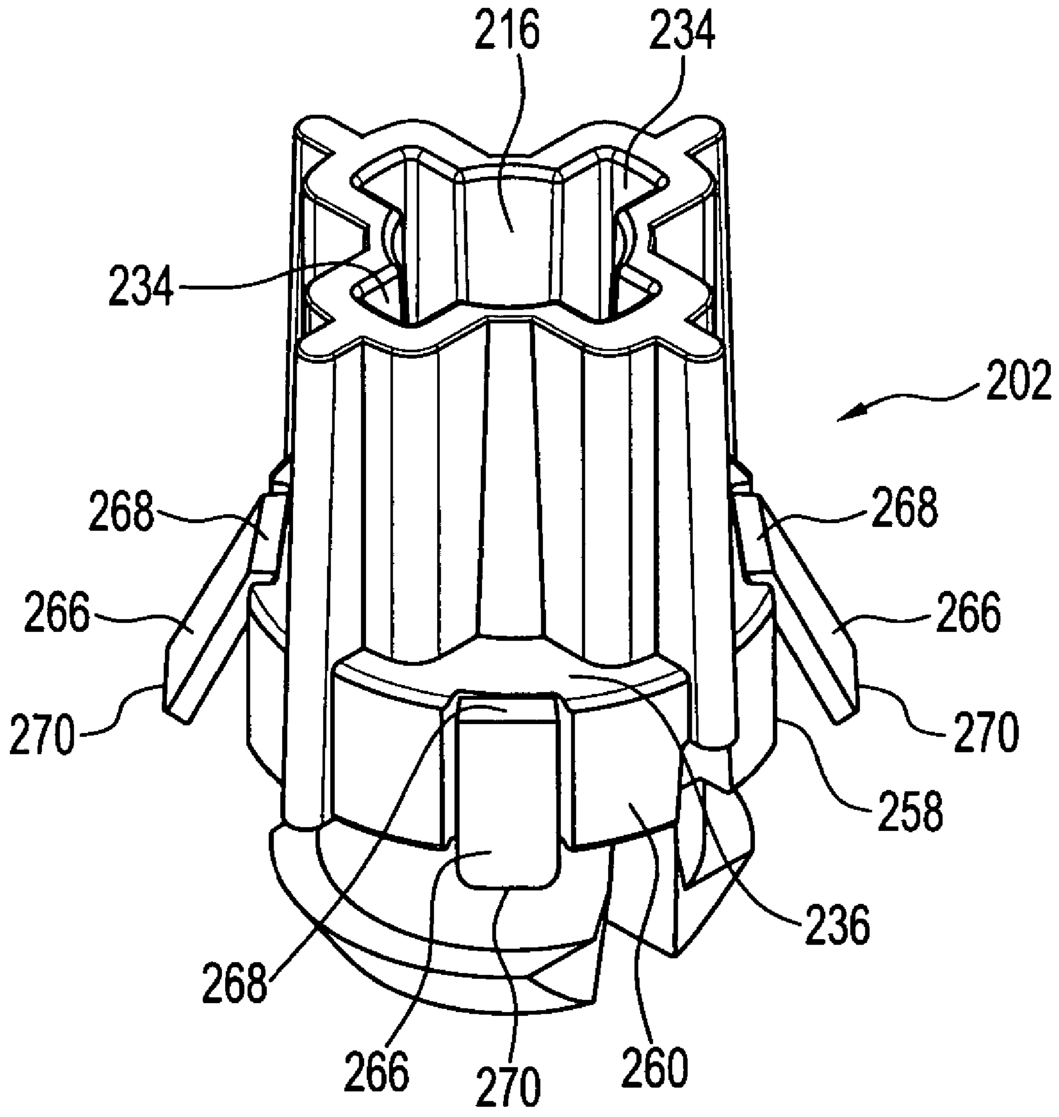
FIG. 14 is a perspective of a fourth embodiment of the present flute holder.

FIG. 14 shows an alternate spring extension 266. The spring extension 266 operates in a manner consistent with the spring extension 256, except that it is has its first end 268 connected to the washer region 236 along its circumference whereas the spring extension 256 has its first end 262 connected to the washer region along its axial direction height (FIG. 12). The spring extension 266 includes a distal second end 270 that moves outward from the washer region 236 in a generally upward direction that is along the axis of the washer region 236, while the spring extension 256 (FIGS. 12 and 13) moves outward in a general direction that is along the radius of the washer region 236. Preferably four spring extensions 266 are provided and spaced substantially evenly in 90° increments about the perimeter of the washer region 236 as shown, although other numbers and locations are contemplated. The storage channel 258 is configured to store the spring extension 266. Although the spring extension 266 provides many of the same benefits and advantages as the spring extension 256 (FIGS. 12 and 13), the spring extension 256 is preferred for many applications because its fabrication is generally more convenient and lest costly in an injection molding process.

The spring extensions 256 and 266 have been discovered to offer benefits and advantages related to enhancing the holding power between the flute holder 202 and tool barrels. For example, when the flute holder 202 is inserted into a tool barrel and the extensions 256 and 266 urged towards the washer region 236, a spring force in the opposite direction (i.e., towards the tool barrel) results that enhances holding power. This is particularly beneficial for purposes of using the flute holder 202 with tool barrels of differing diameters.

Although exemplary flute holders of the invention have been shown and described herein, equivalents, variations, and alternate invention embodiments will be apparent to those knowledgeable in the art. Also, the description made herein of particular invention embodiments is not intended to limit the scope of the invention defined by the claims attached hereto. By way of example, it will be appreciated that one embodiment of the invention may include a flute holder, another may include a flute holder with a fastener such as a nail or a screw retained therein, while still another may include an assembled bracket, flute holder, and fastener.

Further, it will be appreciated that the present invention will provide valuable benefits and advantages when practiced with a wide variety of brackets, with bridle rings, tie strap holders, conduit clamps, rod hangers, and one hole straps being examples.

What is claimed is:

1. A flute holder configured for holding a fastener and being insertable in a fastener driving tool comprising:

a bracket-engaging portion configured for engaging a bracket;

a tool-engaging sleeve connected to said bracket-engaging portion, having a major axis, an upper end, and a washer region having an increased wall thickness compared to a portion of said tool-engaging sleeve proximate to said upper end, said washer region forming a substantially cylindrical shaped portion of said tool-engaging sleeve disposed adjacent to said bracket-engaging portion;

a plurality of fins extending radially outward from said tool-engaging sleeve configured to engage the tool, said fins extending parallel to said major axis of said tool engaging sleeve and extending over at least a portion of said washer region; and, a holding passage at least partially defined within said tool-engaging sleeve.

2. A flute holder as defined by claim 1 wherein said bracket-engaging portion is configured to fixably engage the bracket and retain the flute holder in a substantially stationary position at an angle of about 90° to the bracket.

3. A flute holder as defined by claim 1 wherein said bracket-engaging portion has a generally tapered end.

4. A flute holder as defined by claim 1 wherein said bracket-engaging portion includes a plurality of feet.

5. A flute holder as defined by claim 4 wherein said bracket-engaging portion further includes at least one slot separating said plurality of feet from one another.

6. A flute holder as defined by claim 5 wherein said bracket-engaging portion includes first and second shoulders that define a substantially annular groove.

7. A flute holder as defined by claim 6 wherein the flute holder is configured for use with a bracket having a bracket passage extending through a mounting plate, and wherein said first and second shoulders are configured to engage the bracket mounting plate and said annular groove is configured to be positioned within said bracket passage.

8. A flute holder as defined by claim 6 wherein at least one of said first and second shoulders is tapered.

9. A flute holder as defined by claim 5 wherein the flute holder is configured for use with a bracket, wherein said bracket-engaging portion includes a plurality of feet for engaging the bracket, wherein said holding passage is partially defined within said tool-engaging portion and includes a plurality of cams separated from one another by a slot for engaging the fastener, said cams operative to urge said plurality of feet in an outward direction and into engagement with the bracket when said cams engage the fastener.

10. A bracket and fastener including the flute holder of claim 5 wherein a fastener of the type that has an insertion tip is held in said holding passage, and wherein said bracket-engaging portion is removably engaged with said bracket and firmly held at an angle of about 90° to said bracket with said fastener insertion tip held within said flute holder, said tool-engaging portion thereby positioned for insertion into the barrel of a driving tool.

11. A bracket and fastener as defined by claim 10, wherein said bracket includes a bracket mounting plate with a bracket passage extending therethrough, wherein said bracket-engaging portion includes a plurality of feet separated from one another by at least one slot and configured to be held at least partially within said bracket passage.

12. A flute holder as defined by claim 5 wherein said tool-engaging sleeve has a length along said major axis, and wherein said fins extend for substantially the entire length of said tool engaging sleeve.

13. A flute holder configured for holding a fastener and being insertable in a fastener driving tool comprising:

a bracket-engaging portion configured for engaging a bracket;

a tool-engaging sleeve connected to said bracket-engaging portion having a major axis and a washer region and a sidewall, a plurality of channels arranged about said sidewall along said sleeve major axis and terminating proximate to said washer region;

a plurality of fins extending radially outward from said tool-engaging sleeve configured to engage the tool, said fins extending parallel to said major axis of said tool engaging sleeve for a distance longer than said channels extend along said tool-engaging sleeve; and, a holding passage at least partially defined within said tool-engaging sleeve.

14. A flute holder as defined by claim 6 wherein the flute holder is configured for use with a bracket having a bracket passage, and wherein said bracket-engaging portion includes a plurality of feet separated from one another by a slot, said plurality of feet configured to move towards one another as they are inserted through the bracket passage and to move away from one another to lock the holder in place on the bracket once they have passed through the bracket passage.

15. A flute holder as defined by claim 6 wherein said holding passage is partially defined within said bracket-engaging portion.

16. A flute holder as defined by claim 6 wherein said tool-engaging sleeve is generally cross-shaped.

17. A flute holder as defined by claim 7 wherein said tool-engaging sleeve further comprise a cylindrical washer region having an outer circumference, said plurality of fins extending radially outward from said sleeve by a distance greater than said washer region outer circumference.

18. A flute holder as defined by claim 6 wherein said fins have a length in the direction of said major axis, and wherein said fins are tapered along said length.

19. A flute holder configured for holding a fastener and being insertable in a fastener driving tool comprising:

a bracket-engaging portion configured for engaging a bracket and including first and second shoulders that define a substantially annular groove;

a tool-engaging sleeve connected to said bracket-engaging portion and having a major axis and an upper end;

a plurality of fins extending radially outward from said tool-engaging sleeve configured to engage the tool, said fins extending parallel to said major axis of said tool engaging sleeve from said sleeve upper end to a lower termination point proximate an upper of said first and second shoulders; and, a holding passage at least partially defined within said tool-engaging sleeve.

20. A flute holder as defined by claim 7 wherein said holding passage includes a sidewall and a plurality of engaging surfaces separated from one another by slots in said sidewall extending in the direction of said major axis and configured for engaging the shaft of the fastener.

21. A flute holder as defined by claim 7 wherein said holding passage further includes at least two cams symmetrically arranged within said bracket engaging portion and separated from one another by at least one slot.

22. A flute holder as defined by claim 21 wherein said pair of cams each have a surface that in combination form a general funnel shape configured to engage a fastening end of the fastener.

23. A flute holder as defined by claim 21 and wherein said holding passage includes a plurality of engaging surfaces configured for engaging the fastener, said engaging surfaces generally tapered from a top end to a lower end, said lower end smoothly transitioning to said at least two cams.

24. A flute holder as defined by claim 7 wherein said tool-engaging sleeve includes a sidewall and a plurality of channels in said sidewall running in the direction of said major axis of said tool-engaging sleeve, said channels configured to aid splitting of said engaging sleeve as a fastener held by the sleeve is acted on by a tool.

25. A flute holder as defined by claim 24 wherein said plurality of channels are on the interior of said sidewall.

26. A flute holder as defined by claim 24 wherein said plurality of channels are on the exterior of said sidewall.

* * * * *